United States Patent [19]

Moscaret et al.

[11] 3,894,701

[45] July 15, 1975

[54] INFORMATION CARRIER MAGAZINE HANDLING APPARATUS

[75] Inventors: Eugene J. Moscaret, Arcadia; Thomas C. Soran, West Covina, both of Calif.

[73] Assignee: Bell & Howell Company, Chicago, Ill.

[22] Filed: July 2, 1973

[21] Appl. No.: 376,071

[52] U.S. Cl. .................................... 242/194; 360/93

[51] Int. Cl. ......................... G03b 1/04; G11b 15/32

[58] Field of Search .................... 242/194, 197–200; 274/4 B, 4 C, 4 F, 11 B, 11 C; 352/156, 78; 353/26; 179/100.2 T, 100.2 Z; 360/93

[56] References Cited

UNITED STATES PATENTS

| | | | |
|---|---|---|---|
| 2,941,739 | 6/1960 | Burke et al. | 242/182 |
| 3,552,684 | 1/1971 | Pineda | 242/194 |
| 3,672,603 | 6/1972 | Swain | 242/194 |
| 3,719,417 | 3/1973 | Lecoeur | 352/78 R |

*Primary Examiner*—Leonard D. Christian
*Attorney, Agent, or Firm*—Benoit Law Corporation

[57] ABSTRACT

A movable carriage is provided for supporting a magazine containing an information carrier having opposite ends on different reels inside the magazine. The carriage is constructed to have a first position in which a portion of the information carrier is located at a station for performing a function relative to the carrier, and a second position in which all portions of the information carrier are spaced from the function-performing station.

29 Claims, 15 Drawing Figures

INFORMATION CARRIER MAGAZINE HANDLING APPARATUS

BACKGROUND OF THE INVENTION

1. Field of the Invention

The subject invention relates to apparatus for performing a function relative to a web-like information carrier having opposite ends on different reels located in an information carrier magazine, such as a film magazine or recording tape cassette.

2. Description of the Prior Art

Various types of display or playback apparatus have appeared in recent years which employ endless film or tape loops in magazines or cassettes.

An annoying drawback of such systems, which arises from the lack of a film or tape beginning and end, is that the user typically cannot ascertain what feature is up for display or reproduction at the beginning of a display or playback operation. Also, the wear and tear on the information carrier is typically great because of the sliding motion which occurs in endless film or tape loop systems between adjacent turns. Further factors which increase wear and tear and decrease operational reliability include friction occurring between the film or tape coil and its drive, and the typically complex film or tape path to or from the coil. In practical systems, these drawbacks engender the further drawback that the film or tape capacity of the magazine or cassette is naturally limited in endless film or tape systems.

Many of these drawbacks are avoided in display or playback systems in which the film or tape is not of the endless type, but has opposite ends on different reels. However, problems then occur from the necessity of rewinding the film or tape between performances.

A proposal according to the U.S. Pat. No. 3,606,977, by Tokusaburo Kakiuchi, issued Sept. 21, 1971, establishes separate display and rewind positions between which a film cassette is shifted in a motion picture projector. Apparently, the objective was to facilitate the construction and operation of the projector. However, the concept and implementation of that proposal are obviously only suitable for smaller cartridges having a limited weight and capacity comparable to those occurring with endless loop systems.

SUMMARY OF THE INVENTION

It is an object of the invention to overcome the above mentioned disadvantages.

It is a further object of the invention to provide improved apparatus for selectively performing a function (recording, playback, erasing, photographing, filming, displaying, projecting, etc.) at a function-performing station relative to a web-like information carrier having opposite ends, respectively, on two different reels located in an information carrier magazine.

It is a related object of this invention to provide improved apparatus of the latter type capable of handling relatively long and heavy information carriers.

It is a further related object of this invention to provide improved apparatus of the latter type in which rewinding of the information carrier is handled effectively and with an economy of effort and equipment.

It is another object of this invention to provide improved apparatus of the latter type in which space savings and improved ease of handling are realized with the aid of stacked reel arrangements.

It is a further object of this invention to provide reel-to-reel systems which are compatible with equipment designed for endless film or tape cartridges.

Other objects of this invention will become apparent in the further course of this disclosure.

The subject invention broadly resides in apparatus for selectively performing a function at a function-performing station relative to a web-like information carrier having opposite ends, respectively, on two different reels located in an information carrier magazine.

From one aspect thereof, the invention resides more specifically in the improvement comprising, in combination, means for supporting the above mentioned magazine and the reels with the information carrier, including a movable carriage for the magazine with the reels and information carrier, this movable carriage being constructed to have a first position in which a portion of the information carrier is located at the function-performing station, and a second position in which all portions of the information carrier are spaced from the function-performing station, and means at least in part supported by the carriage and operatively associated with the reels for selectively winding the information carrier onto one of the reels and alternatively onto the other of the reels.

In accordance with a preferred embodiment of the subject invention, the reels are stacked and coaxial, and the winding means include two coaxial drive spindles rotatably mounted on the carriage and engageable with the reels.

From another aspect thereof, the invention resides more specifically in the improvement comprising, in combination, means for mounting the reels in stacked and coaxial relationship inside the magazine, means including a rotatable drive spindle engageable with either of the reels for selectively winding the information carrier onto one of the reels and alternatively onto the other of the reels, means for mounting the drive spindle for movement in a direction toward the function-performing station for placement of a portion of the information carrier at the function-performing station, and alternatively for movement in a direction away from the function-performing station for placement of all portions of the information carrier in spaced relationship to the function performing station, and means for alternatively placing said drive spindle into force-transmitting engagement with one of said reels and into force-transmitting engagement with the other of said reels.

In accordance with a preferred embodiment of the subject invention, the apparatus according to the latter aspect includes means for engaging the magazine, and means for actuating these engaging means to withdraw the magazine from the function-performing station.

In accordance with a further preferred embodiment of the subject invention, the apparatus according to the latter aspect includes means for supporting the weight of the magazine and the reels with the information carrier and the above mentioned means for mounting the drive spindle include means, such as a carriage, for mounting the drive spindle for movement relative to the latter supporting means.

From yet another aspect thereof, the invention more specifically resides in the improvement comprising, in combination, means for supporting the magazine and the reels with the information carrier, a drive spindle at the supporting means, the drive spindle having force transmission means constructed and positioned for engagement by one of the reels when the magazine occupies a first position on the supporting means and for engagement by the other of the reels when the magazine occupies a second position on the supporting means, and means coupled to the drive spindle for rotating the drive spindle to effect winding of the information carrier onto the mentioned one reel when the magazine occupies the first position and to effect winding of the information carrier onto the mentioned other reel when the magazine occupies the mentioned second position.

In accordance with a preferred embodiment of the subject invention, the latter magazine has a first side and a second side opposite the first side, and the mentioned force transmission means on the drive spindle are constructed and positioned for engagement by the mentioned one reel when the magazine is positioned with one of the first and second sides on the supporting means, and for engagement by the other reel when the magazine is positioned with the other of the first and second sides on the supporting means.

In accordance with a further preferred embodiment of the subject invention, the magazine has a first side and a second side opposite the first side, the reels are stacked and coaxial, the mentioned one reel has a first hub adjacent a first magazine side for engagement by the force transmission means when the magazine is positioned with one of the first and second sides on the supporting means, and the other reel has a second hub adjacent the second magazine side for engagement by the force transmission means when the magazine is positioned with the other of the first and second sides on the supporting means. The apparatus according to this preferred embodiment may also include selectively actuable means for withdrawing the drive spindle into the supporting. Additionally or alternatively, the apparatus may include means operatively associated with the mentioned drive spindle rotating means for inhibiting winding of the information carrier onto one of the reels unless the magazine is located with a predetermined side on the supporting means.

All the apparatus according to the subject invention herein disclosed may include means for advancing the information carrier at the function-performing station. These apparatus may further include means for pulling the information carrier from one of the reels when the information carrier is advanced at the function-performing station and is being wound onto the other of the reels.

In accordance with a preferred embodiment of the subject invention, the latter means for pulling the information carrier include rotatable means for engaging and advancing the information carrier, means for mounting these rotatable means inside the magazine, and means for rotating these rotatable means.

In accordance with a further preferred embodiment of the subject invention, the above mentioned means for pulling the information carrier include rotatable means for advancing the information carrier, means for sensing the tension of the information carrier, means coupled to the tension-sensing means for placing the information carrier into engagement with the mentioned rotatable means as a function of sensed tension, means for mounting the mentioned rotatable means, the tension-sensing means and the mentioned means coupled to the tension-sensing means inside the magazine, and means for rotating the rotatable means.

The latter means for rotating the rotatable means may include means for rotating these rotatable means at an essentially constant speed.

BRIEF DESCRIPTION OF THE DRAWINGS

The subject invention and its objects will become more readily apparent from the following detailed description of preferred embodiments thereof, illustrated by way of example in the accompanying drawings, in which like reference numerals designate like or functionally equivalent parts, and in which.

DESCRIPTION OF PREFERRED EMBODIMENTS

By way of example, and not by way of limitation, the illustrated preferred embodiments are described in terms of equipment for displaying motion picture features which may be of a sound accompanied type. It is, however, to be understood that the subject invention is of general utility in the image recording and display field, in the sound recording and display art, and in other information recording and/or playback areas.

Figures 1, 2, 3:
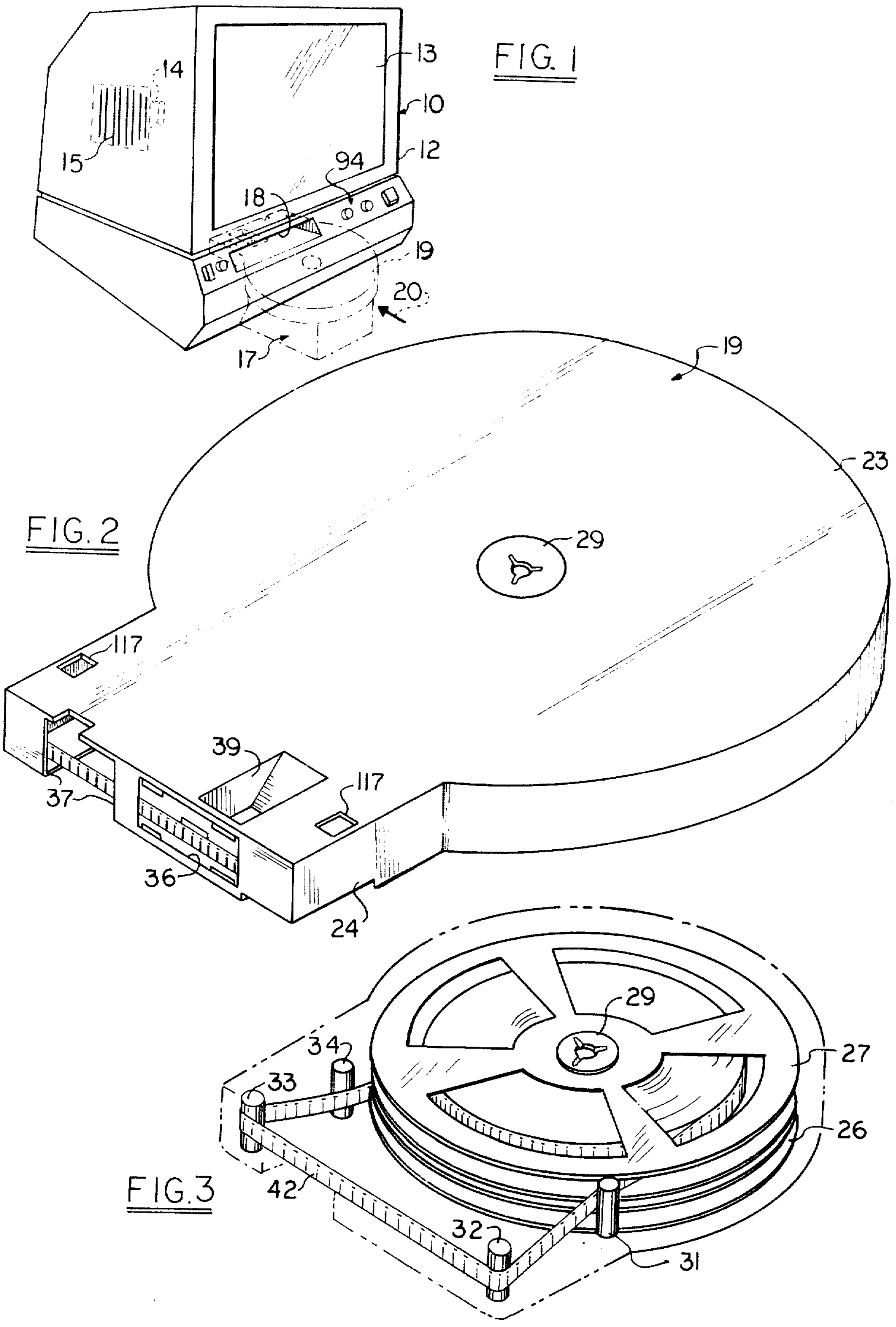
FIG. 1 is a perspective view of an audio-visual apparatus employing information carrier magazines and magazine handling apparatus in accordance with preferred embodiments of the subject invention.
FIG. 2 is a perspective view of an information carrier magazine employed in the practice of the subject invention.
FIG. 3 is a perspective view of the information carrier reel arrangement employed inside the magazine shown in FIG. 2.

The audio-visual display apparatus 10 of FIG. 1 has a housing 12 having a rear projection display screen mounted at the front thereof. A loudspeaker 14 is mounted behind a grille 15 at a side of the housing for reproducing sound accompaniments.

The audio-visual display apparatus as such may be of a conventional type, such as disclosed, for instance, in the U.S. Pat. Nos. 3,244,469 and 3,244,470, by R. G. Hennessey et al, issued Apr. 5, 1966, and herewith incorporated by reference herein. Reference may also be had to the prior art cited in these patents.

In accordance with a preferred embodiment of the subject invention, an information carrier magazine handling apparatus 17 (hereinafter for brevity sometimes referred to as "magazine support") is disposed in front of the display apparatus proper adjacent a slit 18. That slit 18 serves the reception of the front end of a film magazine 19 which is placed on the magazine support 17 and inserted in the direction of an arrow 20. As illustrated, the magazine support 17 may be contoured to the outer configuration of the display apparatus proper. The magazine support 17 may also be fastened to the display apparatus proper by such conventional means as brackets, screws, bolts and the like fasteners (not shown).

As seen in FIG. 2 and in several other figures, the film magazine 19 has a generally circular housing 23 with an integral generally rectangular front end 24.

As seen more specifically in FIG. 3, the housing 23 contains a pair of stacked film reels 26 and 27 which are coaxially mounted with the aid of reel hubs, 28 and 29.

Figure 15:
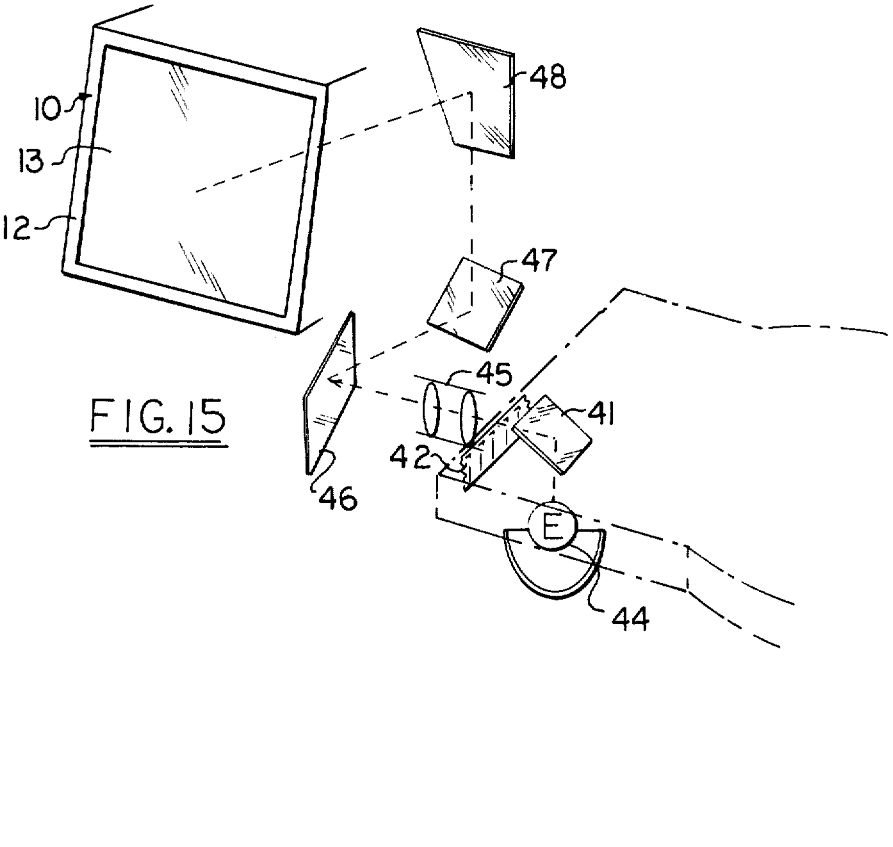
FIG. 15 is a perspective viewing of optical equipment employed in the audio-visual apparatus of FIG. 1.

Several posts or rollers 31, 32, 33, and 34 are mounted in the film magazine and serve to guide the film to and from the reels 26 and 27 and past projection and sound pickup openings 36 and 37 in the magazine front end 24. The magazine front end 24 has a cavity 39 for receiving a mirror as seen in FIG. 15 at 41. In the display mode of the apparatus, motion picture film 42 is advanced from one of the reels 26 and 27 to the other of the reels. The mirror 41 reflects light from a projection lamp 44 and projects such light to the display screen 13 by way of the film 42, a projector lens system 45, and further mirrors 46, 47, and 48, as diagrammatically illustrated in FIG. 15.

The film 42 may be advanced in a conventional manner, such as by means of intermittent film advance equipment if an intermittent film advance is desired, or by means of continuous film feed equipment if a continuous film feed display system is employed. An example of a conventional film advance claw mechanism of the type employed in motion picture projectors is shown at 51 in FIG. 12.

Figure 4:
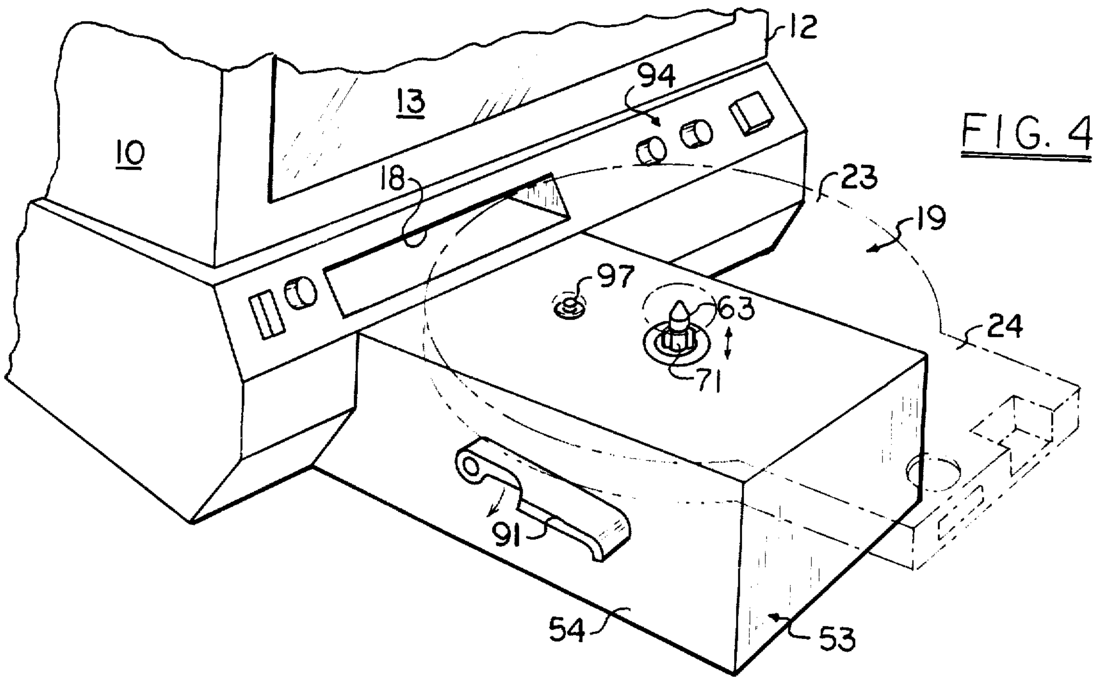
FIG. 4 is a perspective view of an information carrier magazine handling apparatus in accordance with a preferred embodiment of the subject invention.
Figure 5:
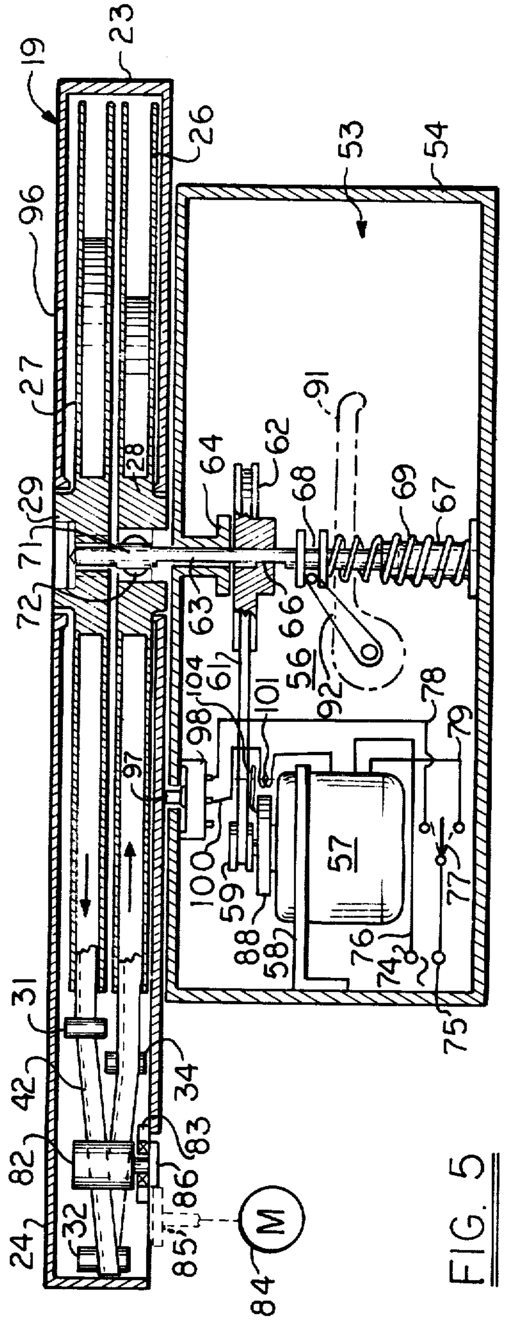
FIG. 5 illustrates a longitudinal section through the magazine handling apparatus of FIG. 4 and through the magazine of FIG. 2.

As shown in FIGS. 4 and 5, a magazine support 53 in accordance with a preferred embodiment of the subject invention has a base 54 for supporting the magazine 19 and the reels 26 and 27 with the film 42.

A reel drive 56 is located in the base 54 and comprises an electric motor 57 mounted on a bracket 58 attached to the base 54. The motor 57 has a pulley 59 which drives a belt 61 which, in turn, rotates a pulley 62.

The pulley 62 rotates a drive spindle 63 which extends through a bearing 64 into the region above the base 54. The pulley 62 and drive spindle 63 are keyed to each other at 66 for relative movement of the drive spindle 63 relative to the pulley 62. A lower end of the drive spindle 63 rotates in a bearing 67 which is attached to the bottom of the base 54.

The drive spindle 63 has a flange 68, and a spring 69 acts between the bearing 67 and flange 68 to bias the drive spindle upwardly so that the spindle extends at least into the hub of the reel being at the time most closely adjacent the base 54.

In order to drive the latter reel (e.g. the reel 26 as shown in FIG. 5), the drive spindle has force transmission means 71 including dogs or ears 72 for engaging the reel hub 28.

The motor 57 is of a conventional dual speed type, to permit rotation of the film takeup reel 26 at normal speed during motion picture display, and to permit alternatively rewinding of the film at a higher speed between display intervals.

As shown in FIG. 5, the motor 57 may be energized from power supply terminals 74 and 75 via a common lead 76 and also by way of a switch 77. The switch 77 is of a double-throw type having a center position in which the motor 57 is deenergized, and having an upper position in which the power terminal 75 is connected to a lead 78. The switch 77 also has a lower position (as seen in FIG. 5) in which the power input terminal 75 is connected to a lead 79.

Energization of the common lead 76 and the latter lead 79 from the power input terminals 74 and 75 causes the motor 57 to rotate the reel 26 as a film takeup reel in the display mode of the apparatus.

Figure 12:
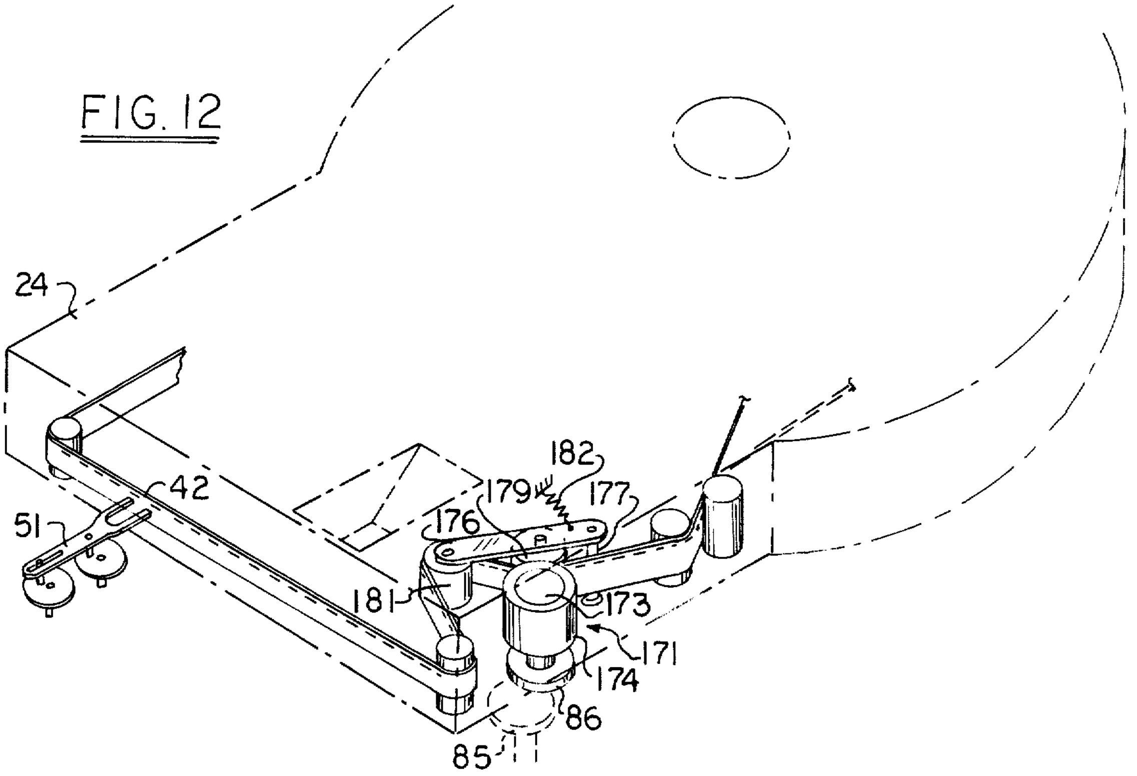
FIG. 12 is a perspective view of equipment for driving and advancing the information carrier in and at the magazine shown in FIG. 2.

The motion picture feature may thus be displayed from the film 42, with the claw device 51 shown in FIG. 12 operating as a film advance mechanism. Rather long features may be displayed from one and the same film in this manner, as the dual reel system according to the subject invention is not burdened with the above mentioned limitations of endless film loop equipment.

If the film in the magazine 19 is very long, an extra device for pulling film off the film supply reel can be employed to aid the film advance mechanism in its function. Such a device may comprise a film sprocket or capstan as indicated in FIG. 5 at 82. The sprocket or capstan is preferably mounted in the magazine 19 by means of a bearing 83. A drive 84 rotates the sprocket or capstan 82 with the aid of mutually engaging drive rollers 85 and 86, at least one of which may have an outer rubber coating for improved force transmission.

The drive 84 and drive roller 85 may be incorporated in the display apparatus proper so that the roller 85 is engaged by the roller 86 when the magazine is in its inserted position relative to the display apparatus.

In accordance with standard practice, a friction clutch or other device, shown only diagrammatically at 88, may be employed to compensate during the film display operation for the increasing diameter of the film roll on the takeup reel.

The flange 68 is part of selectively actuable means for withdrawing the drive spindle 63 into the support 53. Other parts of these means include a manually actuable lever 91, seen best in FIG. 4 and a link 92 connected to and movable with the lever 91 and engaging the flange 68 for withdrawing the drive spindle 63 into the support 54 when the lever 91 is manually depressed.

With the drive spindle 63 withdrawn as just described, insertion of the front end 24 of the film magazine 19 into the slot 18 in the display apparatus proper, and alternative withdrawal of the front end 24 from the display apparatus proper become possible. For instance, the magazine 19 may be slid on top of the support housing 54 with the magazine front end 24 being inserted into the slot 18 until the foremost portion of the film 42 is located at the film advance mechanism and in the projection path of the display apparatus 10.

The handle 91 is then released so that the spindle 63 moves upwardly from its withdrawn position until the force transmission means 71 with their dogs 72 has engaged the hub 28 of the lower film reel 26. The switch 77 is then actuated to its lower position as seen in FIG. 5 whereby the reel 26 is driven as a film takeup reel, with the reel 27 being the film supply reel in the projection process. The switch 77 may either be located at the magazine support housing 54 or at the manual controls 94 at the display apparatus proper. Display of the particular motion picture feature and, if applicable, reproduction of a sound accompaniment, may then proceed in a conventional manner.

Upon completion of the display of a motion picture feature, the lever 91 is depressed and the magazine 19 is withdrawn from the display apparatus proper and is flipped over to the position illustrated in phantom outline in FIG. 4. The lever 91 is then released, so that the force transmission means 71 of the drive spindle 63 enter the hub 29 of the reel 27 which is now located next adjacent the top of the housing 54.

In that position of the magazine 19, an aperture 96 in the magazine housing 23 clears a button 97 of a switch 98. The switch 98 is of a normally closed type and is therefore maintained open as long as the magazine 19 is located on the housing 94 in the position shown in FIG. 5 for a display of a motion picture feature. In that state, the switch 98 serves to inhibit a fast forward drive of the spindle 63 and of the reel 26 through inadvertent actuation of the switch 77 to its fast forward position.

On the other hand, after the magazine 19 has been located in the manner shown in FIG. 4, rewinding of the film from the reel 26 onto the reel 27 may commence. To this end, the switch 77 is actuated to its upper position as seen in FIG. 5. This establishes an energizing circuit for the motor 57 from the power input terminal 75, through the switch 77, the lead 78, the switch 98, which is now closed since its button 97 clears the aperture 96 in the magazine housing 23, a lead 100, a solenoid 101, a lead 102, high-speed windings of the motor 57, the common lead 76, and the power input terminal 74. The energized solenoid 101 actuates a detent 104 for arresting or otherwise deactivating the slip clutch 88 which is not needed during rapid film rewind. Of course, those skilled in the art of film drives will recognize that the solenoid 101 and detent 104 are only symbolic of a variety of known means for selectively activating and deactivating a slip clutch in response to an electric current.

For instance, the clutch 88 may be an electromechanical clutch which provides a friction coupling in the electrically deenergized state and alternatively a relatively rigid direct coupling in the electrically energized condition. Also, the solenoid 101 may be replaced by a relay which controls a direct-current energizing circuit (not shown) for the electromagnetic clutch.

After the film 42 has been rewound, the film magazine 19 may be stored or the display of the particular feature may be repeated, as desired.

Considering the general organization and operation of the preferred embodiment shown in FIGS. 4 and 5, it is seen that the drive spindle 63 has force transmission means 71 constructed and positioned for engagement by one of the reels 26 and 27 when the magazine 19 occupies a first position on the supporting means 54, and for engagement by the other of these reels when the magazine 19 occupies a second position on the supporting means. The motor 57 with associated parts constitutes means coupled to the drive spindle 63 for rotating this spindle to effect winding of the information carrier 42 onto the one reel when the magazine 19 occupies the mentioned first position and to effect winding of the information carrier onto the other reel when the magazine occupies the mentioned second position.

The magazine 19 may be said to have a first side and a second side opposite the first side, and the force transmission means 71 on the drive spindle 63 may be said to be constructed and positioned for engagement by the mentioned one reel when the magazine is positioned with one of its first and second sides on the supporting means 54, and for engagement by the other reel when the magazine is positioned with the other of its first and second sides on the supporting means or housing 54.

The switch 98 with its button 97 constitute means operatively associated with the spindle rotating means for inhibiting winding of the information carrier 42 onto one of the film reels unless the magazine 19 is located with a predetermined side on the supporting means 54, whereby the aperture 96 clears the switch button 97.

Figure 6:
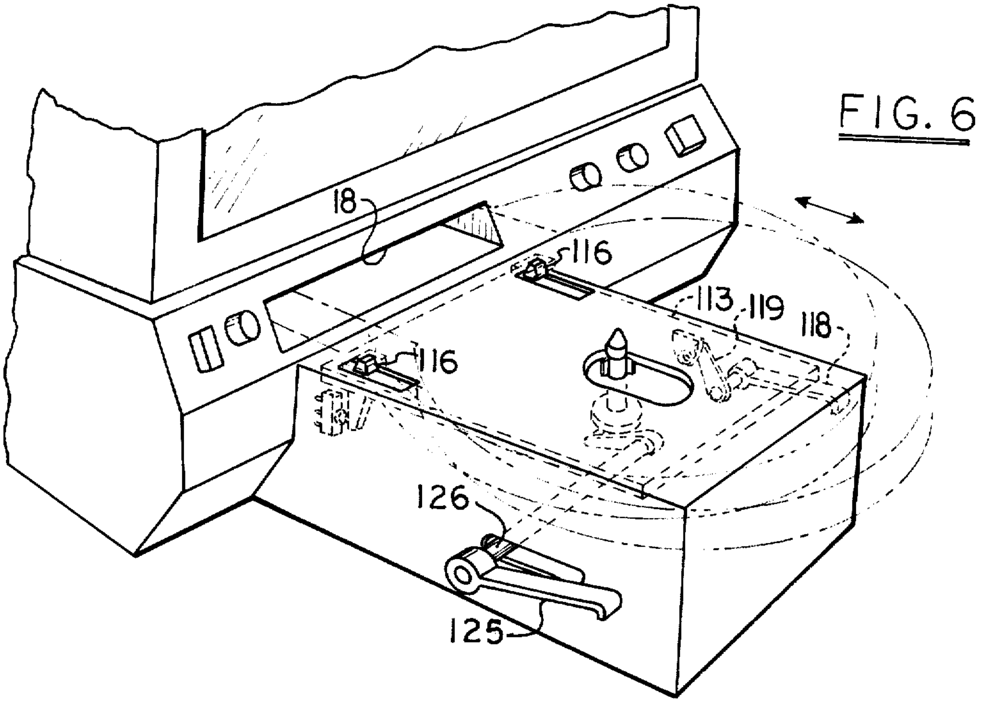
FIG. 6 is a perspective view of an information carrier magazine handling apparatus in accordance with a further preferred embodiment of the subject invention.
Figure 11:
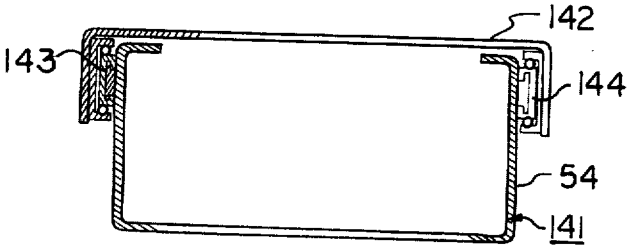
FIG. 11 is a diagrammatic showing of carriage support means employed in the apparatus of FIGS. 8 and 9 and represents a showing of parts of a section taken across the apparatus of FIGS. 8 and 9 from side to side.
Figure 7:
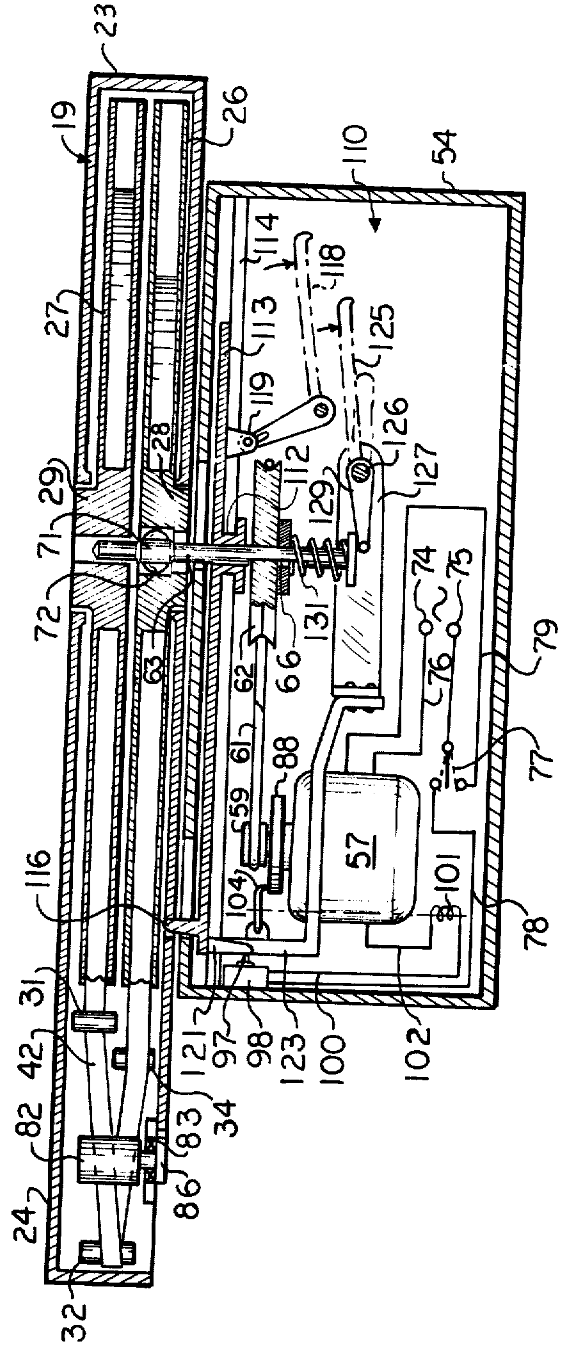
FIG. 7 illustrates a longitudinal section through the magazine handling apparatus of FIG. 6 and the magazine of FIG. 2.

A magazine and film handling apparatus 110 in accordance with a further preferred embodiment of the subject invention is shown in FIGS. 6 and 7.

In the embodiment shown in FIGS. 6 and 7, the spindle 63 is rotatably mounted with a bearing 112 on a carriage 113 which is slidable on a support 114 located inside the housing 54 for movement in a direction at right angles to said drive spindle. In this manner, the spindle 63 and the magazine 19 are movable in a direction towards the display apparatus proper for placing of a portion of the film 42 at the display station, and alternatively movable in a direction away from the display apparatus proper for placement of all the portions of the information carrier in spaced relationship to the display station. This renders the drive spindle 63 movable relative to the support provided by the housing 54. A pair of dogs or claws 116 are connected to and project from the carriage 113 for engaging the magazine 19 at two apertures 117 (see FIG. 2). A manually actuable lever 118 is coupled to the carriage 113 by a link 119. Manual depression of the lever 118 actuates the carriage 113 and the dogs 116 to withdraw the magazine front end 24 from the projection station inside the slot 18. Alternatively, the magazine 19, after having been placed on the support 54 with one of the reel hubs engaging the spindle force transmission means 71, may be moved to the left as seen in FIGS. 6 and 7 for an insertion of the magazine front end 24 into the slot 18 in the display apparatus proper, preparatory to a display operation. To this end, the lever 118 may be moved upwardly as seen in FIGS. 6 and 7, either by manual actuation of the lever 118 or by manually engaging and pushing the magazine 19 to the left.

Film takeup during feature display and rapid film rewinding in display intervals may be controlled by a switch 77 as before. The above mentioned switch 98, which is now actuated by a projection 121 of the carriage 113, again inhibits rapid film rewind as long as the film 42 is in engagement with the film advance mechanism in the display apparatus proper.

A bracket 123 mounts the motor 57 on the carriage 113 for movement therewith. Since in the embodiment of FIGS. 6 and 7, the magazine 19 is not flipped over for rapid film rewind, it follows that the spindle drive, including the motor 59 is of a type which reverses its sense of rotation. To this end, the motor winding (not shown) between the common lead 76 and the lead 102 are of a conventional type which impart a magnetization which is opposite to the magnetization imparted by the motor windings (not shown) connected between the common lead 76 and the lead 79, so that the sense of rotation of the motor 57 is reversed upon energization of the lead 102. Alternatively, a polarity reversal switch (not shown) may be employed in conjunction with the switch 77 to provide for a reversal of the motor rotation in any well-known manner.

A lever 125 is attached to a shaft 126 which is rotatably mounted on a bracket 127. The bracket 127 is attached to the bracket 123 for movement with the carriage 113.

Depression of the lever 125 actuates a link 129 which moves the drive spindle 63 upwardly against the force of a bias spring 131.

The bias spring 131 maintains the drive spindle 63 in its lower position illustrated in FIG. 7 as long as the lever 125 is not depressed. In that position, the force transmitting means 71 of the drive spindle 63 engage the hub 28 of the lower reel 26 so that film may be wound onto the reel 26 by action of the motor 57 during the display of a motion picture feature.

When it is desired to rewind the film 42 onto the upper reel 27, the lever 118 is depressed so that the carriage 113 is moved to the right as seen in FIG. 7 and the front end 24 of the magazine 119 is removed from the apparatus proper through the slot 18 whereby the film 42 is disengaged from the film advance mechanism in the apparatus proper. This also moves the carriage projection 121 away from the switch 98, thereby releasing the switch button 97 and cancelling the inhibition of a rapid film rewind operation.

Preparatory to a rapid film rewind operation, the lever 125 is depressed, whereby the drive spindle 63 is moved upwardly, placing the force transmission means 71 into engagement with the hub 29 of the upper reel 27. Movement of the switch 77 will then energize the motor 57 for a rapid rewinding of the film back onto the reel 27. If desired, a switch of the type of the previously described switch 98 may be employed in series with that switch 98 any may be located at the link 129 to inhibit energization of the motor 57 for rapid film rewind until the lever 125 has been fully depressed.

The magazine and the film handling apparatus 141 of the preferred embodiment shown in FIGS. 8 to 11 has a movable carriage 142 for the magazine 19 with the reels 26 and 27 and the film 42. In the preferred embodiment illustrated in FIGS. 8 to 11, the carriage 142 rides on top of the housing 54 for movement in a direction at right angles to drive spindles 151 and 152, with the aid of conventional elongate ball bearing slides 143 and 144 (see FIG. 11) for supporting the magazine and the reels with the film.

Figure 8:
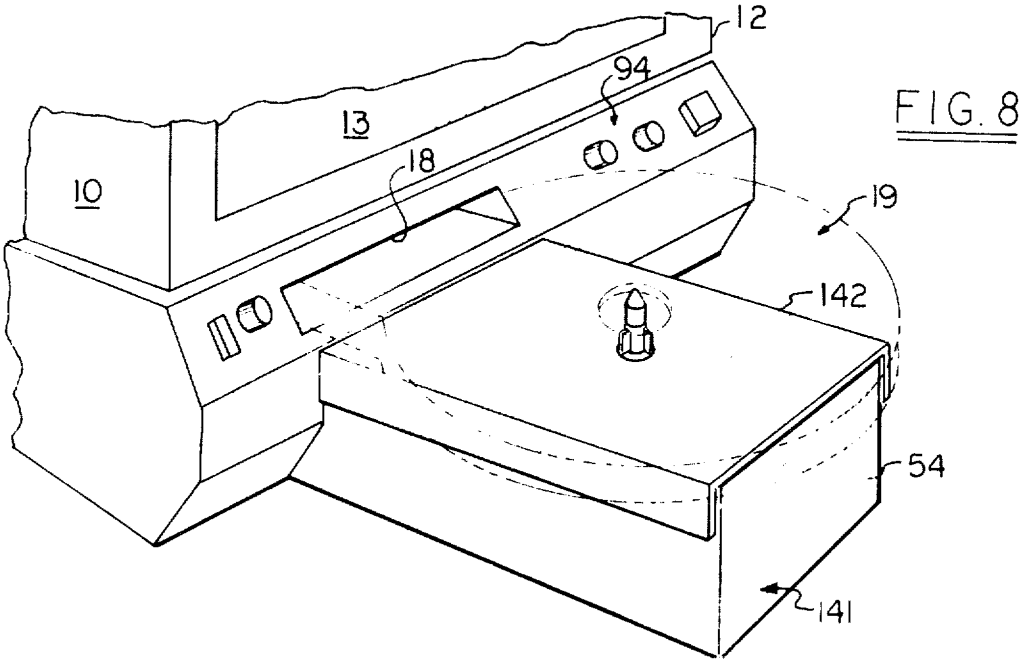
FIG. 8 is a perspective view of an information carrier magazine handling apparatus in accordance with a further preferred embodiment of the subject invention.
Figures 9, 13, 14:
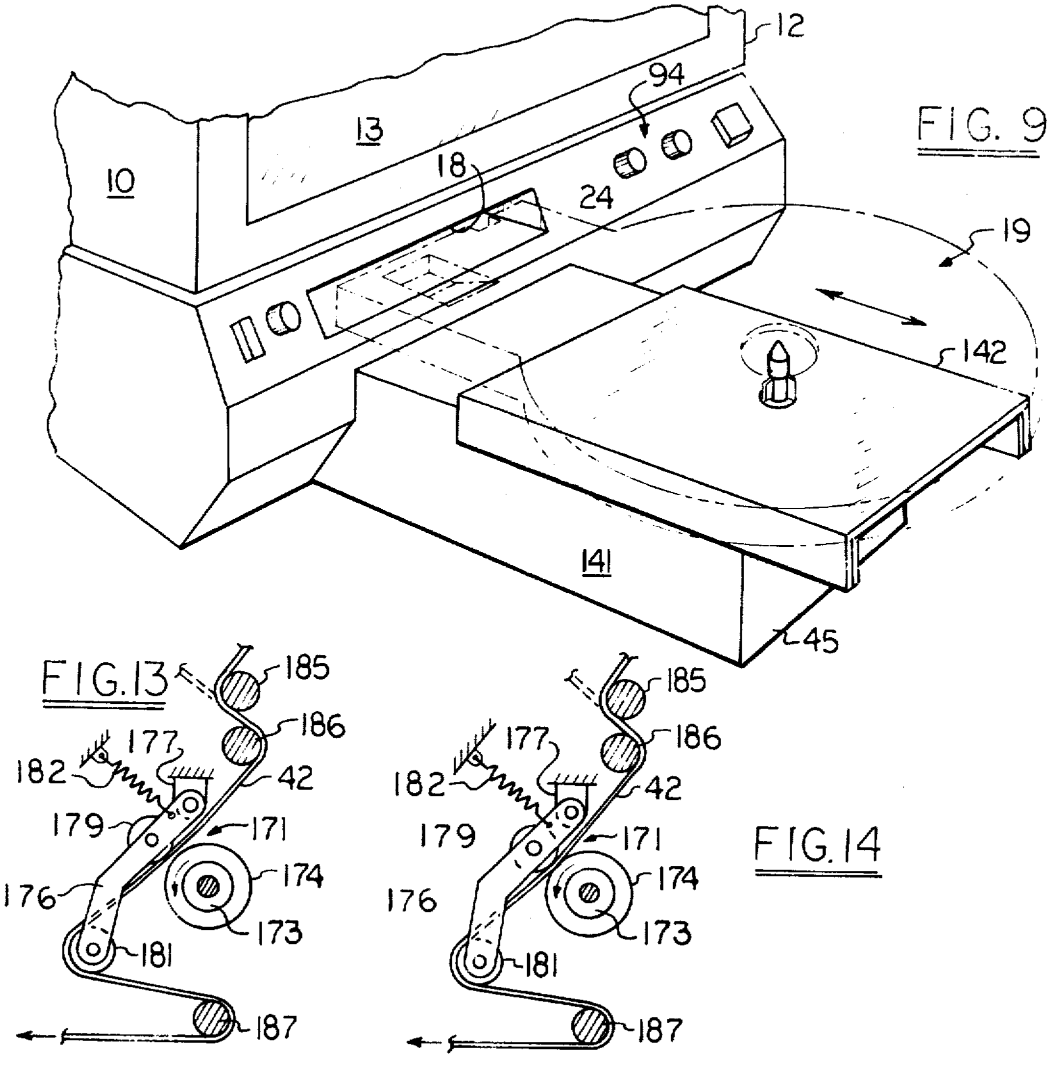
FIG. 9 is a view similar to FIG. 8, showing the magazine handling apparatus in a different operative state.
FIGS. 13 and 14 are top views of part of the information carrier advance equipment shown in FIG. 12.

The carriage 142 is constructed to have a first position, shown in FIG. 8, in which a portion of the film 42 is located at the projection station in the display apparatus proper. The carriage 142 is also constructed to have a second position in which all portions of the film 42 are spaced from the projection station. As seen in FIG. 9, the travel of the carriage 142 between its first and second positions is sufficient for a complete removal of the magazine front end 24 from the slit 18 in the display apparatus proper. The film magazine 19 may, therefore, be positioned for insertion of the front end 24 into the slot 18 when the carriage 142 is in its mentioned second position. In addition, the magazine 19 may be removed from the magazine and film handling apparatus 141 when the carriage 142 is in its mentioned second position.

The magazine and film handling apparatus 141 further include means at least in part supported by the carriage 142 for selectively winding the film 42 onto one of the reels 26 and 27 and alternatively onto the other of these reels. In their preferred embodiment shown in FIGS. 8 to 11, these film winding means include a coaxial drive spindle arrangement 144 and a pair of motors 57 and 145. The drive spindle arrangement 144 is rotatably mounted on the carriage 142 by a bearing 147. The motors 57 and 145 are mounted on and suspended from the carriage 142 by brackets 148 and 149, respectively.

Figure 10:
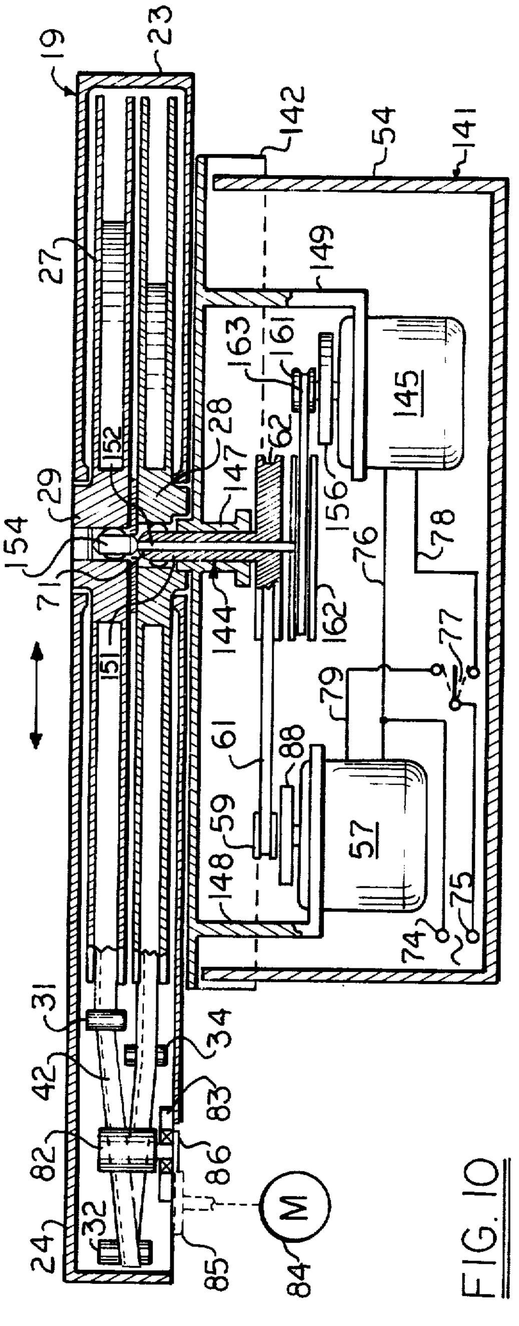
FIG. 10 illustrates a longitudinal section through the apparatus of FIGS. 8 and 9 and through the magazine of FIG. 2.

The motor 57 in the preferred embodiment shown in FIGS. 8 to 11 need only be of a simple type having a single speed of rotation upon the energization of the motor 57 by the switch 77 in its upper position as shown in FIG. 10. In that position, the motor 57 is energized from the power input terminals 74 and 75 via the common lead 76 and the switch 77 and lead 79. The slip clutch 88 may, if desired, include a conventional one-way clutch so that the rotor of the motor 57 need not be rotated by the motor 154 by way of the film 42 when the film is being rewound between display operations.

The spindle arrangement 144 comprises coaxial drive spindles 151 and 152. The drive spindle 151 has force transmission means 71 of the above mentioned type for engaging the hub 28 and rotating the reel 26. Similarly, the drive spindle 152 has force transmission means 154 for engaging the hub 29 and rotating the reel 27.

The drive spindle 151 is driven by the motor 57 by way of the pulleys 59 and 62 and belt transmission 61 to drive the reel 26 as a film takeup reel during the display of the motion picture feature by the apparatus 10. The motor 145 may have a conventional one-way clutch 156 associated therewith so that its rotor need not be rotated by the motor 57 by way of the film 42 during feature display. Of course, the one-way clutch 156 may be omitted if the inertia provided by the rotor of the motor 154 is desired during the film advance in the feature display process.

Upon completion of a feature display operation, the carriage 142 with the magazine 19 is manually moved from the first position shown in FIG. 8 to the second position shown in FIG. 9. The film 42 having thus been disengaged from the film advance mechanism in the display apparatus proper, the switch 77 is actuated for an energization of the motor 145 from the power input terminals 74 and 75, by way of the common lead 76, the switch 77 and the lead 78. As before, a switch 98 may be employed, such as in the manner shown in FIG. 7, to inhibit rapid film rewind until the magazine carriage 142 has been located in its second position shown in FIG. 9.

The rapid rewind motor 145 rotates the drive spindle 152 by way of pulleys 161 and 162 and a belt transmission 163, so as to rewind the film 42 onto the upper reel 27.

The magazine 19 may then be replaced by another film magazine or the magazine 19 may be positioned for renewed display of its feature by movement of the carriage 142 back to its first position shown in FIG. 8.

The embodiment of the subject invention shown in FIGS. 8 to 11 is presently preferred by us for its significant mechanical simplicity and great operational reliability. Also, this preferred embodiment requires a minimum of training of, and a minimum of attention by, the operator.

As has already been indicated above, it is frequently desirable with larger film reels and longer filmed features that a device, such as the above mentioned sprocket or capstan 82 aid the film advance mechanism 51 in advancing the film during feature display. Combination of a more sophisticated film pulling mechanism with other features of the subject invention will now be disclosed with the aid of FIGS. 12 to 14. It is to be understood that this film pulling mechanism may be employed in combination with any of the preferred embodiments herein disclosed.

The film pulling mechanism 171 shown in FIGS. 12 to 14 operates in addition to the film advance mechanism 51 in pulling film 42 from the film supply reel during the feature display. This film pulling mechanism in accordance with its illustrated preferred embodiment includes a roller 173 which has a circumferential coating 174 of high-friction material (rubber, elastomer). The roller 174 is preferably rotated at constant speed from the inside of the display apparatus proper. The above mentioned drive 84 and engaging rollers 85 and 86 may be employed for this purpose.

The film pulling mechanism 171 further includes means for sensing the tension of the film 42 and means coupled to these tension-sensing means for placing the film 42 in engagement with the roller 173 as a function of sensed tension. These latter means include an arm 176 which is pivotally mounted at 177 on the inside of the magazine front end 24. A roller 179 is rotatably mounted on the arm 176. A further roller 181 is rotatably mounted at an end of the arm 176. A spring 182 biases the arm 176 in a clockwise direction as seen in FIGS. 12 to 14.

The film 42 is threaded by way of stationary posts 185, 186, and 187 as shown. The posts 185 and 186 permit accommodation of the film at various incident angles during diameter changes of the film coil on the film supply reel. The post 187 facilitates the tension-sensing function of the film pulling mechanism. If the tension on the film 42 is light, then the regular film advance mechanism 51 can handle advancement of the film and no assist by the power-driven roller 173 is then necessary to pull film from the supply reel. Accordingly, the spring 182 then maintains the roller 179 sufficiently spaced from the roller 173 so that the film 42 does not engage that power roller.

On the other hand, tension on the film will occur if the film advance mechanism 51 is no longer capable of handling the film advance without assistance. In that case, the tensioning film will act on the roller 181 in order to cause the arm 176 to rotate against the bias of the spring 182 and to have the roller 179 press the film 42 into engagement with the high-friction coating 174 of the power roller 173. The power roller 173 thus becomes effective to pull film from the film supply reel as a function of sensed tension. After the power roller 174 has remedied the sensed excessive tape tension, the spring 182 will again become effective to achieve disengagement of the film 42 from the power roller coating 174.

It will thus be recognized that the film pulling mechanism 171 illustrated in FIGS. 12 to 14 may serve as an important adjunct to the other features of the subject invention herein disclosed, since this film pulling mechanism further promotes one of the objects of the subject invention permitting the accommodation of longer filmed features in a single film magazine.

Modifications and variations within the spirit and scope of the subject invention will become apparent from the subject disclosure to those skilled in the art.

We claim:

1. In apparatus for selectively performing a function at a function-performing station relative to a web-like information carrier having opposite ends, respectively, on two different reels located in an information carrier magazine, the improvement comprising in combination:

means for supporting said magazine and said reels with said information carrier, including a movable carriage for said magazine with said reels and said information carrier, said movable carriage being constructed to have a first position in which a portion of said information carrier is located at said function-performing station, and a second position in which all portions of said information carrier are spaced from said function-performing station; and means at least in part supported by said carriage and operatively associated with said reels for selectively winding said information carrier onto one of said reels and alternatively onto the other of said reels.

2. An apparatus as claimed in claim 1, wherein:

said reels are stacked and coaxial; and said winding means include two coaxial drive spindles rotatably mounted on said carriage and engageable with said reels.

3. An apparatus as claimed in claim 1, including:

means for advancing said information carrier at said function-performing station.

4. An apparatus as claimed in claim 2, including:

means for pulling said information carrier from one of said reels when said information carrier is advanced at said function-performing station and is being wound onto the other of said reels.

5. An apparatus as claimed in claim 4, wherein:

said means for pulling said information carrier include rotatable means for engaging and advancing said information carrier, means for mounting said rotatable means inside said magazine, and means for rotating said rotatable means.

6. An apparatus as claimed in claim 4, wherein:

said means for pulling said information carrier include rotatable means for advancing said information carrier, means for sensing the tension of said information carrier, means coupled to said tension-sensing means for placing said information carrier into engagement with said rotatable means as a function of sensed tension, means for mounting said rotatable means, said tension-sensing means and said means coupled to said tension-sensing means inside said magazine, and means for rotating said rotatable means.

7. An apparatus as claimed in claim 6, wherein: said means for rotating said rotatable means include means for rotating said rotatable means at an essentially constant speed.

8. In apparatus for selectively performing a function at a function-performing station relative to a web-like information carrier having opposite ends, respectively, on two different reels located in an information carrier magazine, the improvement comprising in combination:

means for mounting said reels in stacked and coaxial relationship inside said magazine;

means including a rotatable drive spindle engageable with either of said reels for selectively winding said information carrier onto one of said reels and alternatively onto the other of said reels;

means for mounting said drive spindle for movement in a direction toward said function-performing station for placement of a portion of said information carrier at said function-performing station, and alternatively for movement in a direction away from said function-performing station for placement of all portions of the information carrier in spaced relationship to said function performing station; and means for alternatively placing said drive spindle into force-transmitting engagement with one of said reels and into force-transmitting engagement with the other of said reels.

9. An apparatus as claimed in claim 8, including: means for engaging said magazine; and means for actuating said engaging means to withdraw said magazine from said function-performing station.

10. An apparatus as claimed in claim 8, including: means for advancing said information carrier at said function-performing station.

11. An apparatus as claimed in claim 10, including: means for pulling said information carrier from one of said reels when said information carrier is advanced at said function-performing station and is being wound onto the other of said reels.

12. An apparatus as claimed in claim 11, wherein: said means for pulling said information carrier include rotatable means for engaging and advancing said information carrier, means for mounting said rotatable means inside said magazine, and means for rotating said rotatable means.

13. An apparatus as claimed in claim 11, wherein: said means for pulling said information carrier include rotatable means for advancing said information carrier, means for sensing the tension of said information carrier, means coupled to said tension-sensing means for placing said information carrier into engagement with said rotatable means as a function of sensed tension, means for mounting said rotatable means, said tension-sensing means and said means coupled to said tension-sensing means inside said magazine, and means for rotating said rotatable means.

14. An apparatus as claimed in claim 13, wherein: said means for rotating said rotatable means include means for rotating said rotatable means at an essentially constant speed.

15. An apparatus as claimed in claim 8, including: means for supporting the weight of said magazine and said reels with said information carrier, said means for mounting said drive spindle including means for mounting said drive spindle for movement relative to said supporting means.

16. An apparatus as claimed in claim 15, wherein; said means for mounting said drive spindle include a carriage for said drive spindle.

17. In apparatus for selectively performing a function at a function-performing station relative to a web-like information carrier having opposite ends, respectively, on two different reels located in an information carrier magazine, the improvement comprising in combination:

means for supporting said magazine and said reels with said information carrier;

a drive spindle at said supporting means, said drive spindle having force transmission means constructed and positioned for engagement by one of said reels when said magazine occupies a first position on said supporting means and for engagement by the other of said reels when said magazine occupies a second position on said supporting means; and means coupled to said drive spindle for rotating said drive spindle to effect winding of the information carrier onto said one reel when said magazine occupies said first position and to effect winding of the information carrier onto said other reel when said magazine occupies said second position.

18. An apparatus as claimed in claim 17, wherein: said magazine has a first side and a second side opposite said first side; and said force transmission means on said drive spindle are constructed and positioned for engagement by said one reel when said magazine is positioned with one of said first and second sides on said supporting means, and for engagement by said other reel when said magazine is positioned with the other of said first and second sides on said supporting means.

19. An apparatus as claimed in claim 17, wherein: said magazine has a first side and a second side opposite said first side;

said reels are stacked and coaxial;

said one reel has a first hub adjacent said first maagazine side for engagement by said force transmission means when said magazine is positioned with one of said first and second sides on said supporting means; and said other reel has a second hub adjacent said second magazine side for engagement by said force transmission means when said magazine is positioned with the other of said first and second sides on said supporting means.

20. An apparatus as claimed in claim 19, including: selectively actuable means for withdrawing said drive spindle into said supporting means.

21. An apparatus as claimed in claim 19, including: means operatively associated with said rotating means for inhibiting winding of the information carrier onto one of said reels unless said magazine is located with a predetermined side on said supporting means.

22. An apparatus as claimed in claim 19, including: means for advancing said information carrier at said function-performing station.

23. An apparatus as claimed in claim 22, including:

means for pulling said information carrier from one of said reels when said information carrier is advanced at said function-performing station and is being wound onto the other of said reels.

24. An apparatus as claimed in claim 23, wherein: said means for pulling said information carrier include rotatable means for engaging and advancing said information carrier, means for mounting said rotatable means inside said magazine, and means for rotating said rotatable means.

25. An apparatus as claimed in claim 23, wherein: said means for pulling said information carrier include rotatable means for advancing said information carrier, means for sensing the tension of said information carrier, means coupled to said tension-sensing means for placing said information carrier into engagement with said rotatable means as a function of sensed tension, means for mounting said rotatable means, said tension-sensing means and said means coupled to said tension-sensing means inside said magazine, and means for rotating said rotatable means.

26. An apparatus as claimed in claim 25, wherein: said means for rotating said rotatable means include means for rotating said rotatable means at an essentially constant speed.

27. In apparatus for selectively performing a function at a function-performing station relative to a web-like information carrier having opposite ends, respectively, on two different reels located in an information carrier magazine, the improvement comprising in combination:

means operatively associated with said reels and including at least one drive spindle for selectively winding said information carrier onto one of said reels and alternatively onto the other of said reels; and means for displacing said magazine and said reels with said information carrier, including a carriage having means for engaging said magazine, and means for mounting said carriage for movement in a direction at right angles to said drive spindle, between a first position in which a portion of said information carrier is located at said function-performing station, and a second position in which all portions of said information carrier are spaced from said function-performing station.

28. An apparatus as claimed in claim 27, wherein: said winding means include bearing means for said drive spindle attached to said carriage.

29. An apparatus as claimed in claim 27, including: means for mounting said winding means on said carriage for movement therewith in said direction.

* * * * *